United States Patent Office 3,410,144
Patented Nov. 12, 1968

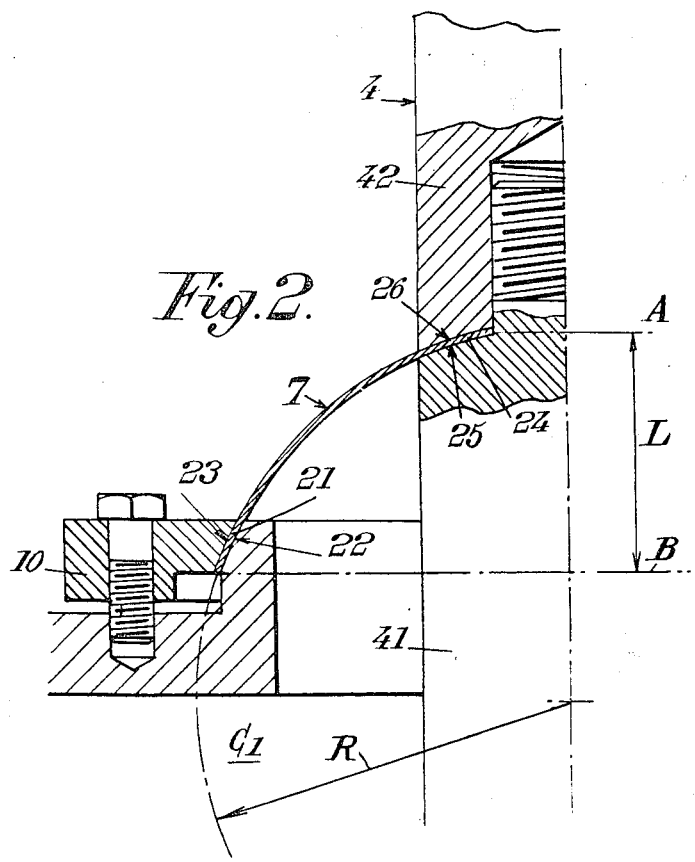
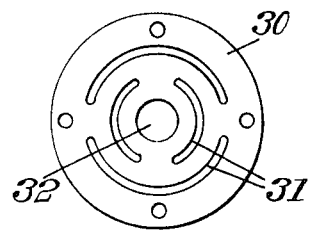

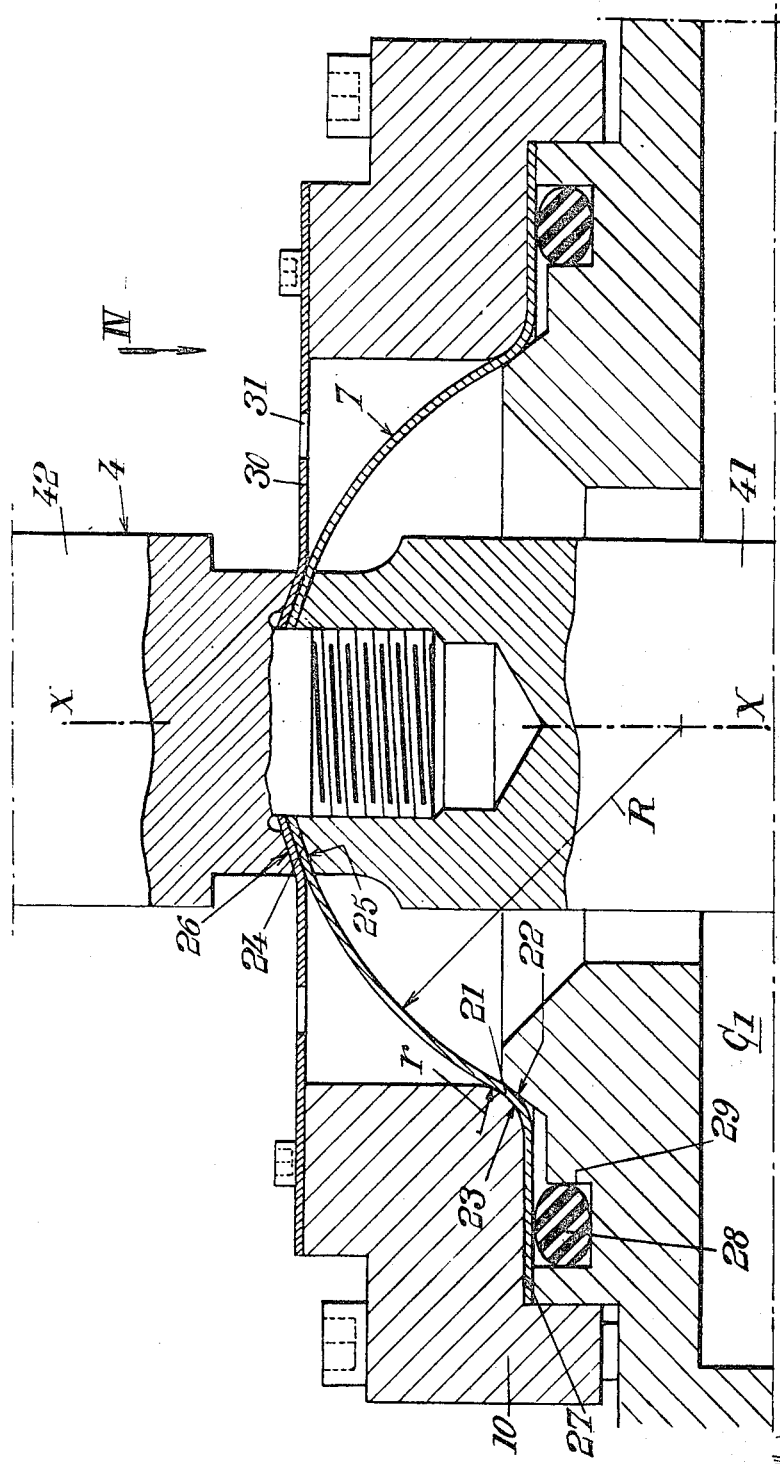

3,410,144
APPARATUS INCLUDING A FLUIDTIGHT CASING AND A PIVOTING TRANSMISSION ARM EXTENDING THROUGH A WALL OF SAID CASING
Jean-Louis Noz, Vire, and Daniel Reverdin, Paris, France, assignors to Precision Mecanique Labinal, Paris, France
Filed Jan. 13, 1967, Ser. No. 609,052
Claims priority, application France, Jan. 25, 1966, 47,148
11 Claims. (Cl. 74—18.1)

ABSTRACT OF THE DISCLOSURE

A fluidtight casing, a movable element on the inside of said casing, a movable element on the outside of said casing, and a transmission arm for connecting said two elements with each other. A thin flexible diaphragm is fixed to the wall of said casing and to said transmission arm. This diaphragm is in the form of a spherical zone and it is fixed to said casing wall and to said arm through parts of said casing wall and of said arm tangent to the outer and inner edges of the spherical zone formed by said diaphragm.

---

The present invention relates to apparatus including, on the one hand, a fluidtight casing separating from each other two fluids at different pressures and located on the inside and on the outside, respectively, of said casing, and, on the other hand, a transmission arm for connecting together two movable elements located on the inside and on the outside, respectively, of said casing, said transmission arm being pivotally connected to said casing about a pivot point located close to the wall of the casing. The invention is more especially but not exclusively concerned with apparatus for causing a pressure difference detected on the inside of a fluidtight casing to act upon a receiver apparatus located on the outside of said casing.

It is known to provide apparatus of this kind with a thin diaphragm, generally flat (at least over most of its surface), deformable and resilient, in the shape of an annular surface of revolution about the axis of the transmission arm, and the peripheral portion of which is fixed by setting along a plane perpendicular to the axis of the transmission arm, to the wall of the fluidtight casing, whereas the central portion of this thin diaphragm is fixed, by wedging along a plane perpendicular to the axis of the transmission arm, to the transmission arm in question.

Such an arrangement permits of obtaining a good fluidtightness of the casing and a correct definition of the pivot point of the transmission arm.

However such an arrangement does not permit of obtaining a sufficient resistance to pressure. The thin diaphragm becomes deformed and the transmission arm is displaced toward the medium where the pressure is lower.

This displacement being detrimental of the precision of the apparatus since it changes the geometrical characteristics of the mechanical connection between the inner movable element and the outer movable element.

In order to obviate this drawback, it has been proposed to provide the apparatus with mechanical holding devices preventing such displacements of the transmission arm toward the medium where the pressure is lower. However, these mechanical devices have, among other drawbacks, that of reducing the sensitiveness of the apparatus.

The object of the present invention is to obviate these drawbacks.

An apparatus according to the present invention is characterized in that,

The thin diaphragm is given the shape of a spherical zone having its center on the axis of the transmission arm and the concavity of which is turned toward the medium where the pressure is higher, The setting of the thin diaphragm at the level of the wall of the fluidtight casing is ensured by pinching of the outer edge of the spherical zone forming the thin diaphragm between two surfaces tangent to said spherical zone, and The setting of this thin diaphragm at the level of the transmission arm is ensured by pinching of the inner edge of the spherical zone forming the thin diaphragm between two surfaces tangent to said spherical zone.

According to a preferred embodiment of the present invention the distance between the two planes limiting the spherical zone formed by the diaphragm is smaller than the radius of said spherical zone.

Preferably the distance between the two planes defining the spherical zone ranges approximately from 75% to 50% of the radius of the spherical zone.

Preferred embodiments of the present invention will be hereinafter described with reference to the appended drawings, given merely by way of example, and in which:

FIG. 1 diagrammatically shows in cross section an apparatus according to the invention;

FIG. 2 shows, on a larger scale, in half section, an element of the apparatus of FIG. 1;

FIG. 3 is a sectional view of a modification of the element shown by FIG. 2; and FIG. 4 is a partial view on the line IV—IV of FIG. 3.

Figure 1:
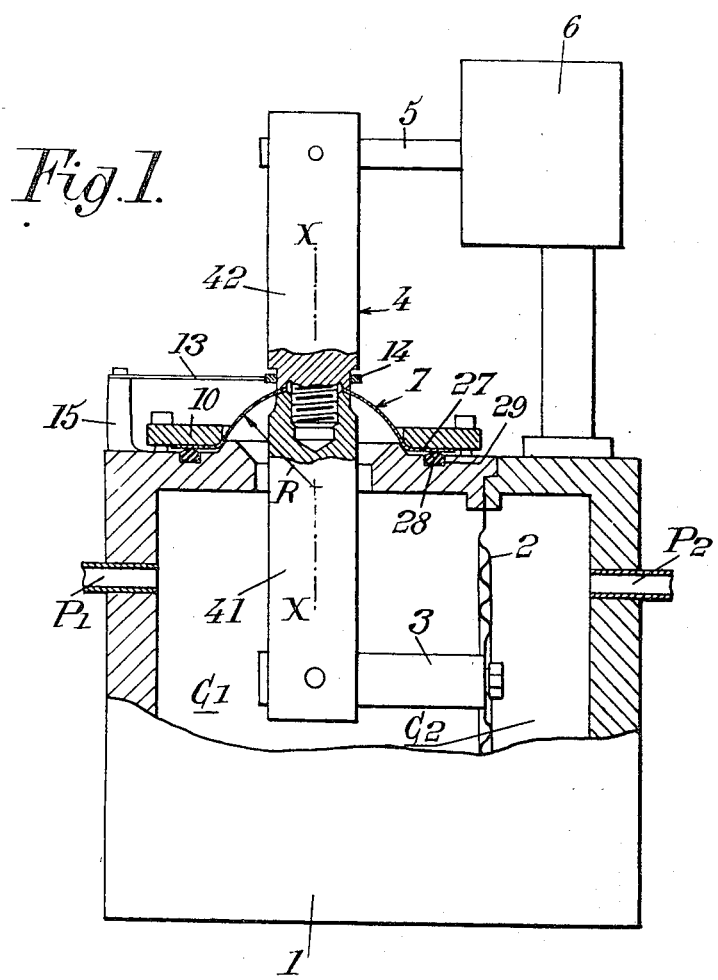

The apparatus according to the present invention, as illustrated by FIG. 1 of the drawings, includes a fluidtight casing 1 capable of resisting the absolute pressures $P_1$ and $P_2$ the difference between which is to be detected. This casing 1 is divided by a fluidtight diaphragm 2 into two chambers $C_1$ and $C_2$ wherein the pressures are $P_1$ and $P_2$ respectively.

Diaphragm 2 is rigid with a rod 3 extending in chamber $C_1$, the displacements of said rod 3 being representative of the difference between pressures $P_1$ and $P_2$.

The pressure of the inner medium is therefore pressure $P_1$ and the pressure of the outer medium, which in this embodiment is constituted by the atmosphere surrounding the apparatus, is the atmospheric pressure. It will be supposed that pressure $P_1$ is considerably higher than the atmospheric pressure.

This is in particular the case when the apparatus serves to measure flow rates of a liquid circulating in suitable conduits under the effect of the pressure $P_1$ existing upstream of a throttled portion of the conduit and a pressure $P_2$ existing downstream of this throttled portion.

The values of $P_1$ and $P_2$ may be as high as several bars (possibly even several tens of bars) whereas the difference between $P_1$ and $P_2$ remains very small, averaging some tenths of a bar.

Such an apparatus further comprises a transmission arm 4 intended to connect the inner movable element 3 with an outer movable element 5 cooperating with a receiver apparatus 6 (generally consisting of a balance) located on the outeside of the fluidtight casing and advantageously carried by said casing 1.

Transmission arm 4 is arranged to pivot about a point located close to the wall of the fluidtight casing forming chamber $C_1$, whereby any torque produced by a tendency to movement of the inner movable element 3 will be transmitted to the outer movable element 5 which cooperates with receiver apparatus 6.

To permit the passage of transmission arm 4 through the wall of casing 1, use is made of a thin diaphragm 7 which is deformable and resilient.

According to the present invention,

This diaphragm 7 is given the shape of a spherical zone having its center on the axis XX of transmission arm 4, the concavity of this diaphragm 7 being turned toward the inside of casing 1 where the pressure is $P_1$.

The setting of this diaphragm 7 in the wall of chamber $C_1$ is obtained by pinching the external edge 21 of the spherical zone formed by said diaphragm 7 between two surfaces 22 and 23 tangent to said spherical zone, and The setting of this diaphragm 7 in said transmission arm 4 is ensured by pinching the inner edge 24 of the spherical zone formed by said diaphragm 7 between two surfaces 25 and 26 tangent to said spherical zone (FIGS. 2 and 3).

Preferably, as shown by FIG. 2, the distance L between the two planes A and B limiting the spherical zone which consitutes diaphragm 7 is smaller than the radius R of said spherical zone.

Advantageously this distance L ranges from 75% to 50% of said radius R.

The fixations thus obtained are capable of resisting the effect of pressure $P_1$ on the whole of diaphragm 7 and transmission arm 4.

In the embodiments illustrated by FIGS. 2 and 3, the surface 22 that cooperates with the concave face of the outer edge 21 of diaphragm 7 is integral with the upper wall of casing 1, whereas the surface 23 that cooperates with the convex face of said edge 21 belongs to a ring 10 fixed by means of bolts upon casing 1.

In the embodiments of FIGS. 2 and 3, transmission arm 4 is made of two portions, to wit an inner portion 41 and an outer portion 42, connected together by screwing of one in the other. Surface 24, which cooperates with the concave face of the smaller radius edge 24 of spherical diaphragm 7 is carried by the inner arm portion 41 whereas the surface 26 that cooperates with the convex face of said edge 24 is carried by the outer portion 42 of transmission arm 4.

In the embodiment of FIG. 2, the surfaces 22 and 23 which hold the edge 21 of diaphragm 7 are spherical zones.

The surface 22 that cooperates with the concave face of outer edge 21 has a radius slightly smaller than the radius R of spherical zone diaphragm 7.

The surface 23 that cooperates with the convex face of edge 21 has a radius slightly greater than said radius R.

The same applies to surfaces 25 and 26 through which the smaller radius edge 24 of the spherical diaphragm is engaged between arm portions 41 and 42.

Surface 25 has a radius slightly smaller than radius R, surface 26 has a radius slightly greater than R.

Provided that ring 10 is tightly applied upon the wall of casing 1, it will be possible, as shown by FIG. 2 to dispense with packing joints.

In the embodiment of FIG. 2 spherical surfaces 22 and 23, and 25 and 26 are relatively difficult to machine. According to another embodiment of the invention illustrated by FIG. 3 these surfaces 22, 23, 25 and 26 are easier to machine.

Surface 22, which cooperates with the concave face of the edge 21 of diaphragm 7, consists of a frustum of a cone coaxial with axis XX.

Surface 23, which cooperates with the convex face of edge 21 consists of a toroidal sector generated by the rotation about axis XX of a circular sector of a radius $r$ small with respect to radius R.

Surface 26, which cooperates with the convex face of the inner edge 24 of diaphragm 7 consists of a frustum of a cone coaxial with axis XX and having the same apex angle as the frustum of a cone constituting the surface 25 cooperating with the concave face of edge 24.

In these conditions, it seems preferable, in order to ensure fluidtightness, to provide diaphragm 7 with a flat peripheral extension 27 perpendicular to axis XX and to provide a packing joint 28 caught between said extension 27 and a groove 29 provided in the wall of chamber $C_1$.

It will be noted that this extension 27 serves merely to crush packing joint 28.

The pivot point might be displaced by the torque transmitted by arm 4, when the value of said torque is high, in a direction perpendicular to the axis XX of arm 4. In order to prevent such a displacement it is advantageous to provide a flexible tie piece between transmission arm 4 at the place thereof corresponding to its pivot point and any suitable fixed point, for instance rigid with casing 1.

For this purpose, as shown by FIG. 1, this flexible tie piece consists of a thin blade 13. This blade 13 is provided at one of its ends with a ring 14 surrounding transmission arm 4 at the level of the pivot point thereof. Preferably this ring 14 surrounds the screw serving to fix the internal portion 41 in the external portion 42 of transmission arm 4. The other end of this blade 13 is fixed to a support 15 rigid with casing 1.

For the same reason, i.e. to avoid any displacement of the pivot point under the action of the force produced by the torque transmitted through arm 4, there may be provided a flexible washer the inner edge of which is fitted on transmission arm 4 in the same manner and at the same level as diaphragm 7, the external edge of said washer being fixed to an annular portion surrounding transmission arm 4.

FIGS. 3 and 4 show this flexible washer at 30.

This washer 30 is provided with curvilinear slots 31 and with a central hole 32 for centering thereof the diameter of which hole 32 being equal to the diameter of the screw for fixing together portions 41 and 42 of arm 4. Advantageously, washer 30 is fixed to ring 10 by means of a circular row of screws.

Finally, it will be noted that in some cases, in particular when the fluid present in chamber $C_1$ is corrosive, it will be advantageous to provide the apparatus with two thin diaphragms made as above stated, to wit, An outer one supporting most, or even the whole, of the mechanical stresses, and An inner one the main function of which is to protect the outer diaphragm from the corrosive action of the fluid present in chamber $C_1$.

These thin diaphragms will be exactly juxtaposed in each other and assembled together exclusively by the engagement of their inner and outer edges.

The apparatus according to this invention for transmitting a pressure difference detected on the inside of a fluidtight casing to a receiver apparatus located on the outside of said casing has many advantages (sensitiveness, safety of operation, accurate transmission and so on), this apparatus comprising a transmission arm pivoting about a point which is accurately defined and the position of which does not vary during the operation, owing to the particular shape and arrangement of the thin diaphragm.

Of course the present invention applies to apparatus for which the pressure of the external medium would be higher than that of the internal medium.

It also applies to apparatus wherein the transmission arm would be actuated by the outer movable element to transmit a torque to a receiver apparatus constituting the inner movable element.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What we claim is:

1. An improved apparatus comprising,
    a fluidtight casing forming a closed chamber, the wall of said casing including a rigid portion and a portion deformable in response to variations of the difference of pressure between the inside and the outside of said casing, two movable elements located respectively on the inside and on the outside of said chamber, and a transmission arm interconnecting said two elements said transmission arm extending through said casing deformable wall portion, wherein the improvement consists, in that said casing rigid wall portions is provided with a circular hole and said casing deformable wall portion is constituted by a thin diaphragm in the form of a spherical zone the concavity of which is on the side thereof where the pressure is higher than on the other side, said circular hole and said spherical zone having a common axis of symmetry, first means being provided on said casing rigid wall portion for clamping the larger diameter edge of said diaphragm to the edge of said circular hole between two surfaces of said casing rigid wall portion tangent to the larger diameter edge portion of said diaphragm and second means being provided on said transmission arm for clamping the smaller diameter edge of said diaphragm to said transmission arm between two portions thereof tangent to the smaller edge portion of said diaphragm.

2. An apparatus according to claim 1 wherein the distance between the two planes limiting said spherical zone is smaller than the radius of said spherical zone.

3. An apparatus according to claim 2 wherein said distance ranges from 75 to 50 percent of said radius.

4. An apparatus according to claim 2 wherein, said diaphragm has its concavity turned toward the inside of said casing, said first means include an annular projection coaxially surrounding said hole and integral with said casing, the outer face of said annular projection forming the surface that fits on the inner face of the larger diameter edge portion of said diaphragm, a rigid ring having its inner face adapted to fit on the outer face of said larger diameter edge portion of said diaphragm and means for tightly securing said ring to said casing rigid wall, said transmission arm being made of two portions in line with each other and assembled together by screwing, said second means consisting of the respective adjacent ends of said transmission arm portions which are shaped to fit on the inner face and the outer face of the smaller diameter edge portion of said diaphragm.

5. An apparatus according to claim 4 wherein the surface of the casing annular projection that cooperates with the inner face of the larger diameter edge portion of said diaphragm is in the form of a spherical zone of a radius slightly smaller than the radius of said spherical zone diaphragm, the surface of said ring that cooperates with the outer face of the larger diameter edge portion of said diaphragm is in the form of a spherical zone of a radius slightly greater than the radius of said spherical zone diaphragm, the surface of the transmission arm portion located inside said casing that cooperates with the inner face of the smaller diameter edge portion of said diaphragm is in the form of a spherical zone of a radius slightly smaller than the radius of said spherical zone diaphragm, and the surface of the transmission arm portion located outside said casing that cooperates with the outer face of the smaller diameter edge portion of said diaphragm is in the form of a spherical zone of a radius slightly greater than the radius of said spherical zone diaphragm.

6. An apparatus according to claim 4 wherein, the surface of the casing annular projection that cooperates with the inner face of the larger diameter end of the spherical zone portion of said diaphragm is a frustum of a cone coaxially surrounding said circular hole, the surface of said ring that cooperates with the outer face of the larger diameter end of the spherical zone portion of said diaphragm is a toroidal surface portion generated by the rotation, about the axis of said circular hole and said spherical zone, of a circular arc of a radius small with respect to the radius of said spherical zone, the surface of the transmission arm portion located on the inside of said diaphragm that cooperates with the inner face of the smaller diameter end of said diaphragm is a frustum of a cone coaxial with said axis, and the surface of the transmission arm portion located on the outside of said diaphragm that cooperates with the outer face of the smaller diameter end of said diaphragm is a frustum of a cone coaxial with, and of the same apex angle as that of, said last mentioned frustum of a cone.

7. An apparatus according to claim 4 wherein said thin diaphragm includes a flat outer flange portion integral therewith and perpendicular to said axis of symmetry, said flange portion bearing against the inner face of said ring, further comprising a packing joint tightly held between said flange portion and the outer face of said casing rigid wall portion surrounding said circular hole.

8. An apparatus according to claim 3 which further comprises a flexible thin blade including, at one end thereof, a ring fitted on said transmission arm at the place where said diaphragm is set thereon, the other end on said thin blade being secured to said rigid casing.

9. An apparatus according to claim 4 further including a flexible washer mounted between said transmission arm at the place where said diaphragm is set thereon and a fixed annular portion of said casing.

10. An apparatus according to claim 9 wherein said flexible washer is provided with curvilinear slots extending about its center.

11. An apparatus according to claim 10 wherein said flexible washer is provided, for fixation thereof to said arm, with a central hole adapted to fit on the screw threaded portion of that of said arm portions which is screwed in the other.

References Cited

UNITED STATES PATENTS 2,322,043   6/1943   McCune _____ 92—168 X

MILTON KAUFMAN, *Primary Examiner.*